United States Patent
Salter et al.

(10) Patent No.: US 11,763,682 B2
(45) Date of Patent: Sep. 19, 2023

(54) COLLECTIVE VEHICLE POWER MANAGEMENT

(71) Applicant: Ford Global Technologies, LLC, Dearborn, MI (US)

(72) Inventors: Stuart C. Salter, White Lake, MI (US); Ryan O'Gorman, Beverly Hills, MI (US); Timothy Harris, Grosse Ile, MI (US); Peter Phung, Windsor (CA); Katherine Howard-Cone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/477,802

(22) Filed: Sep. 17, 2021

(65) Prior Publication Data

US 2023/0088624 A1 Mar. 23, 2023

(51) Int. Cl.
*G08G 1/00* (2006.01)
*B60L 58/14* (2019.01)
*G01C 21/34* (2006.01)

(52) U.S. Cl.
CPC ............... *G08G 1/202* (2013.01); *B60L 58/14* (2019.02); *G01C 21/3469* (2013.01); *G08G 1/205* (2013.01); *B60L 2260/52* (2013.01); *B60L 2260/54* (2013.01)

(58) Field of Classification Search
CPC .......... B60L 53/36; B60L 53/66; B60L 58/13; B60L 2240/62; H02J 7/00032; H02J 7/0048; G05D 1/0088; G05D 2201/0213; G06Q 10/06315; G06Q 50/30; G06Q 30/0282; G06Q 50/06; G06Q 10/04; G07C 5/004
See application file for complete search history.

(56) References Cited

U.S. PATENT DOCUMENTS

| | | | |
|---|---|---|---|
| 7,595,642 B2 | 9/2009 | Doyle | |
| 9,283,954 B2 | 3/2016 | Dalum | |
| 9,315,187 B2 | 4/2016 | Stenson | |
| 10,503,232 B2 | 12/2019 | Lota | |
| 11,214,161 B2 * | 1/2022 | Miller | ............... G06Q 10/06315 |
| 2021/0138928 A1 * | 5/2021 | O'Gorman | ......... G06Q 30/0283 |
| 2022/0072975 A1 * | 3/2022 | O'Gorman | ............... B60L 53/00 |

* cited by examiner

*Primary Examiner* — John Kwon
(74) *Attorney, Agent, or Firm* — Brandon Hicks; Bejin Bieneman PLC

(57) ABSTRACT

A computer is programmed to allocate a plurality of electric vehicles with associated electric machines to locations to perform tasks based on the charges of the electric vehicles and electric machines and expected energy consumptions of the electric vehicles traveling to the locations and of the electric machines performing the tasks at the locations; and in response to a sum of the charges of a first electric vehicle and the electric machines associated with the first electric vehicle being less than a sum of the expected energy consumptions of the first electric vehicle traveling to a first location and of the electric machines associated with the first electric vehicle performing the tasks at the first location, instruct a second electric vehicle to travel to a second location at which the first electric vehicle will be located.

20 Claims, 3 Drawing Sheets

COLLECTIVE VEHICLE POWER MANAGEMENT

BACKGROUND

Types of electric vehicles include plug-in hybrid electric vehicles (PHEVs), hybrid electric vehicles (HEVs), and battery electric vehicles (BEVs). Electric vehicles include electric propulsions that generate energy and translate the energy into motion of the electric vehicles. An electric propulsion may be an all-electric powertrain including batteries, an electric motor, and a transmission that transfers rotational motion to the wheels; or a hybrid powertrain including elements of a conventional powertrain and of the all-electric powertrain.

DETAILED DESCRIPTION

Figure 1:
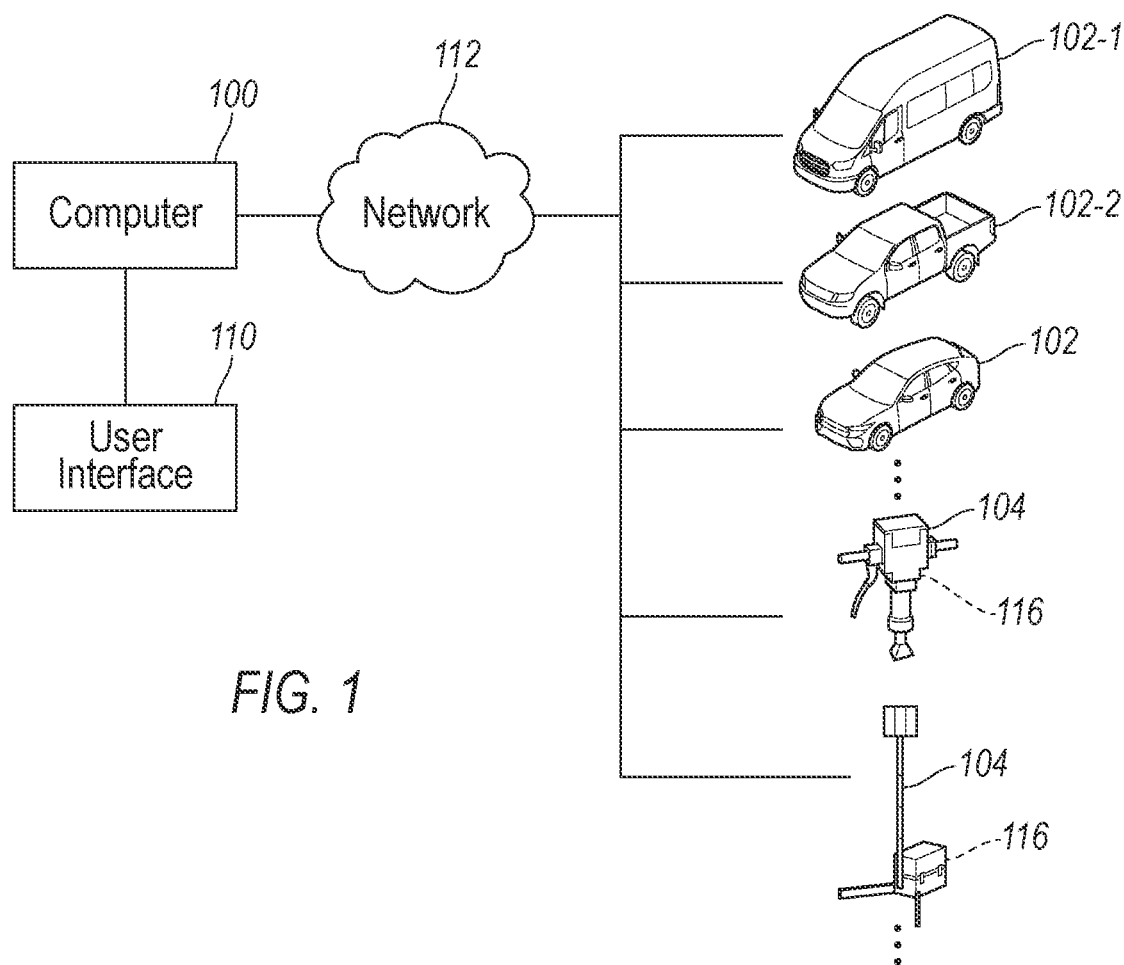
FIG. 1 is a diagram of an example group of electric vehicles.

This disclosure describes systems and techniques for managing energy consumption by a group of electric vehicles that are used to power electric machines. The system can extend performance of the electric vehicles and electric machines, including extending a time during which one or more of the electric vehicles can power electric machines at a location when performing a task.

A computer can allocate the electric vehicles and electric machines to locations at which the electric machines will perform specific tasks. The allocation can be based on the charges held by the electric vehicles and electric machines, the expected energy consumptions of the electric vehicles traveling to the locations, and the expected energy consumptions of the electric machines performing the tasks. If one of the electric vehicles and its associated electric machines have insufficient collective charge for traveling to its allocated location and performing the tasks for that location, then a mitigating operation can be performed, thereby providing sufficient charge. For example, another electric vehicle from the group can meet and charge the electric vehicle at a second location. Other examples include charging at a third location, charging at the location at which the tasks are to be performed, and swapping electric machines with another electric vehicle. The system can help ensure that the electric vehicles and electric machines have sufficient charge for performing the tasks while minimizing a total power draw by the group of electric vehicles.

A computer includes a processor and a memory storing instructions executable by the processor to receive data indicating charges of a plurality of electric vehicles and a plurality of electric machines, the electric vehicles including a first electric vehicle and a second electric vehicle, the electric machines being associated with the respective electric vehicles; receive a plurality of tasks to be performed at a plurality of locations, the locations including a first location; allocate the electric vehicles to the locations based on the charges of the electric vehicles and electric machines and expected energy consumptions of the electric vehicles traveling to the locations and of the electric machines performing the tasks at the locations, the first electric vehicle being allocated to the first location; and in response to a sum of the charges of the first electric vehicle and the electric machines associated with the first electric vehicle being less than a sum of the expected energy consumptions of the first electric vehicle traveling to the first location and of the electric machines associated with the first electric vehicle performing the tasks at the first location, instruct the second electric vehicle to travel to a second location at which the first electric vehicle will be located.

The second location may be the first location.

The second location may be not included in the plurality of locations, and the instructions may further include instructions to instruct the first electric vehicle to travel to the second location before traveling to the first location.

The instructions may further include instructions to instruct the electric vehicles to, after leaving the locations, recharge the electric machines to respective predetermined charge levels. The predetermined charge levels may be below fully charged. The instructions may further include instructions to, in response to one of the electric machines being charged above the respective predetermined charge level after performing the respective tasks at the respective location, instruct the respective electric vehicle to recharge from that electric machine until that electric machine reaches the respective predetermined charge level.

The predetermined charge levels may be below half charged.

The electric vehicles may include a third electric vehicle, the plurality of locations may include a third location to which the third electric vehicle is allocated, and the instructions may further include instructions to, in response to a sum of the charges of the third electric vehicle and the electric machines associated with the third electric vehicle being less than a sum of the expected energy consumptions of the third electric vehicle traveling to the third location and of the electric machines associated with the third electric vehicle performing the tasks at the third location, instruct the third electric vehicle to charge at a fourth location before traveling to the third location. The plurality of locations may be job locations, the electric vehicles may be located at a plurality of storage locations including the fourth location before traveling to the job locations, and the storage locations may be separated from each other.

The electric vehicles may include a third electric vehicle, the plurality of locations may include a third location to which the third electric vehicle is allocated, and the instructions may further include instructions to, in response to a sum of the charges of the third electric vehicle and the electric machines associated with the third electric vehicle being less than a sum of the expected energy consumptions of the third electric vehicle traveling to the third location and of the electric machines associated with the third electric vehicle performing the tasks at the third location, instruct the third electric vehicle to recharge at the third location. The plurality of locations may be job locations, the electric vehicles may be located at a plurality of storage locations before traveling to the job locations, and the storage locations may be nonoverlapping with the job locations.

The instructions may further include instructions to instruct the electric vehicles to, after the tasks are performed at the locations, output data indicating actual energy consumptions of the electric vehicles and the electric machines. The electric vehicles may include a third electric vehicle, and the instructions may further include instructions to, in response to a sum of the actual energy consumptions of the third electric vehicle and the electric machines associated with the third electric vehicle exceeding a sum of the expected energy consumptions of the third electric vehicle and the electric machines associated with the third electric vehicle by at least a threshold, output a message.

The electric vehicles may include a third electric vehicle, and the instructions may further include instructions to, in response to a sum of the actual energy consumptions of the third electric vehicle and the electric machines associated with the third electric vehicle exceeding a sum of the expected energy consumptions of the third electric vehicle and the electric machines associated with the third electric vehicle by at least a threshold, instruct the third electric vehicle to transmit data from a camera of the third electric vehicle.

The electric vehicles may include a third electric vehicle, and the instructions may further include instructions to, in response to a sum of the actual energy consumption of the third electric vehicle and the electric machines associated with the third electric vehicle exceeding a sum of the expected energy consumption of the third electric vehicle and the electric machines associated with the third electric vehicle by at least a threshold, instruct the third electric vehicle to disable a charge port of the third electric vehicle.

The plurality of locations may be separated from each other.

The tasks may include a plurality of types of the tasks, and the expected energy consumptions of the electric machines performing different types of tasks may be different. The electric machines may include a plurality of types of the electric machines associated with the respective types of the tasks.

The instructions may further include instructions to instruct the electric vehicles to charge the respective electric machines via charge ports of the electric vehicles.

A method includes receiving data indicating charges of a plurality of electric vehicles and a plurality of electric machines, the electric vehicles including a first electric vehicle and a second electric vehicle, the electric machines being associated with the respective electric vehicles; receiving a plurality of tasks to be performed at a plurality of locations, the locations including a first location; allocating the electric vehicles to the locations based on the charges of the electric vehicles and electric machines and expected energy consumptions of the electric vehicles traveling to the locations and of the electric machines performing the tasks at the locations, the first electric vehicle being allocated to the first location; and in response to a sum of the charges of the first electric vehicle and the electric machines associated with the first electric vehicle being less than a sum of the expected energy consumptions of the first electric vehicle traveling to the first location and of the electric machines associated with the first electric vehicle performing the tasks at the first location, instructing the second electric vehicle to travel to a second location at which the first electric vehicle will be located.

With reference to the Figures, wherein like numerals indicate like parts throughout the several views, a computer 100 includes a processor and a memory storing instructions executable by the processor to receive data indicating charges of a plurality of electric vehicles 102 and a plurality of electric machines 104, the electric vehicles 102 including a first electric vehicle 102-1 and a second electric vehicle 102-2, the electric machines 104 being associated with the respective electric vehicles 102; receive a plurality of tasks to be performed at a plurality of job locations 106, the job locations 106 including a first job location 106-1; allocate the electric vehicles 102 to the job locations 106 based on the charges of the electric vehicles 102 and electric machines 104 and expected energy consumptions of the electric vehicles 102 traveling to the job locations 106 and of the electric machines 104 performing the tasks at the job locations 106, the first electric vehicle 102-1 being allocated to the first job location 106-1; and in response to a sum of the charges of the first electric vehicle 102-1 and the electric machines 104 associated with the first electric vehicle 102-1 being less than a sum of the expected energy consumptions of the first electric vehicle 102-1 traveling to the first job location 106-1 and of the electric machines 104 associated with the first electric vehicle 102-1 performing the tasks at the first job location 106-1, instruct the second electric vehicle 102-2 to travel to a second location 108 at which the first electric vehicle 102-1 will be located.

With reference to FIG. 1, the computer 100 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 100 can thus include a processor, a memory, etc. The memory of the computer 100 can include media for storing instructions executable by the processor as well as for electronically storing data and/or databases, and/or the computer 100 can include structures such as the foregoing by which programming is provided. The computer 100 can be multiple computers coupled together.

The computer 100 can be communicatively coupled to a user interface 110. The user interface 110 presents information to and receives information from an operator of the computer 100. The user interface 110 may include dials, digital readouts, screens, speakers, and so on for providing information to the operator, e.g., human-machine interface (HMI) elements such as are known. The user interface 110 may include a keyboard, buttons, knobs, keypads, touchscreen, mouse, microphone, and so on for receiving information from the operator.

The computer 100 can communicate with the electric vehicles 102 and electric machines 104 via a network 112. The network 112 represents one or more mechanisms by which the computer 100 may communicate with remote servers. Accordingly, the network 112 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the internet, providing data communication services.

The electric vehicles 102 may be any passenger or commercial automobile such as cars, trucks, sport utility vehicles, crossovers, vans, minivans, taxis, buses, etc. Each electric vehicle 102 includes an electric propulsion 114, as described below. The electric vehicles 102 can be plug-in hybrid electric vehicles (PHEVs), hybrid electric vehicles (HEVs), battery electric vehicles (BEVs), etc.

The electric machines 104 are machines, e.g., tools, that operate on electric current, either direct current or alternating current. The electric machines 104 can operate from an outside power supply such as one of the electric vehicles 102. Alternatively or additionally, the electric machines 104 can include machine batteries 116 that are rechargeable from an outside power supply such as one of the electric vehicles 102. The machine batteries 116 can be any suitable type, e.g., lithium-ion batteries, nickel-metal hydride batteries, lead-acid batteries, ultracapacitors, etc. Each electric machine 104 with a machine battery 116 can have a charge, i.e., a quantity of energy stored in the machine battery 116. The electric machines 104 can be transportable by the electric vehicles 102, i.e., sized so that one of the electric vehicles 102 can carry at least one of the electric machines 104. The electric machines 104 include a plurality of types, e.g., equipment for construction, plumbing, carpentry, electrical work, etc., such as jackhammers, sanders, drills, nail guns, circular saws, lighting, etc.

The electric machines 104 can be associated with the respective electric vehicles 102, i.e., each electric machine 104 can be associated with one of the electric vehicles 102. The computer 100 can store associations between the electric machines 104 and the electric vehicles 102 in memory. Multiple electric machines 104 can be associated with one of the electric vehicles 102. For example, the electric machines 104 can be stored in the electric vehicles 102 with which they are associated.

Figure 2:
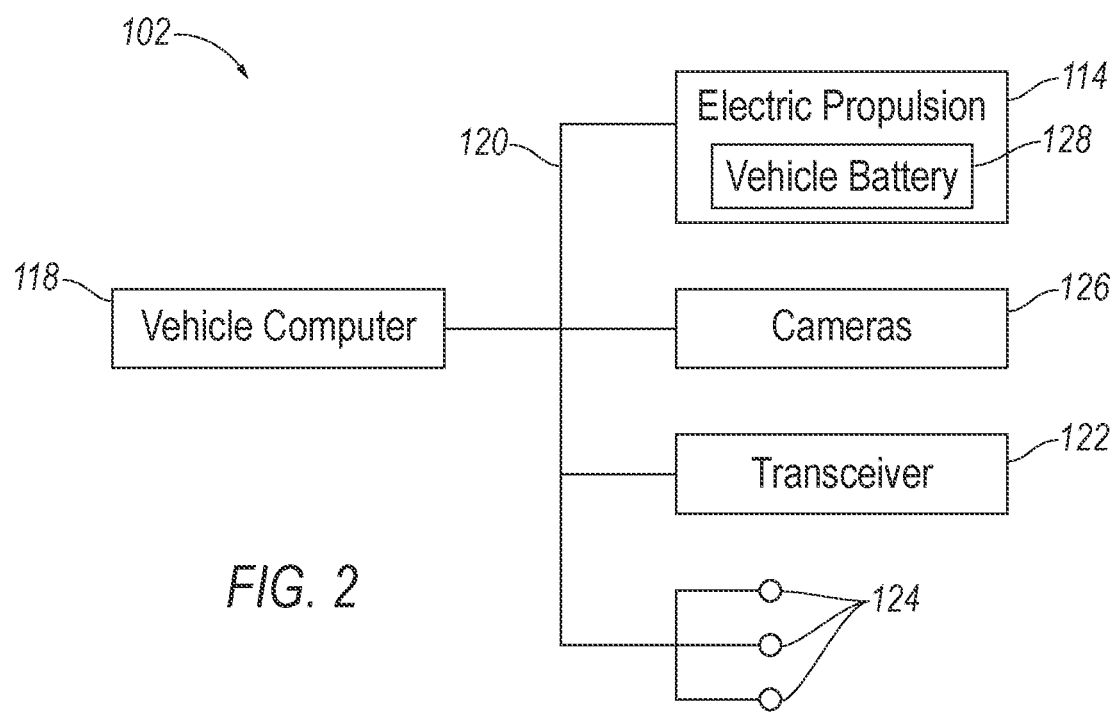
FIG. 2 is a block diagram of one of the electric vehicles.

With reference to FIG. 2, each electric vehicle 102 can include a vehicle computer 118. The vehicle computer 118 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 118 can thus include a processor, a memory, etc. The memory of the vehicle computer 118 can include media for storing instructions executable by the processor as well as for electronically storing data and/or databases, and/or the vehicle computer 118 can include structures such as the foregoing by which programming is provided. The vehicle computer 118 can be multiple computers coupled together onboard the electric vehicle 102.

The vehicle computer 118 may transmit and receive data through a communications network 120 such as a controller area network (CAN) bus, Ethernet, WiFi, Local Interconnect Network (LIN), onboard diagnostics connector (OBD-II), and/or by any other wired or wireless communications network. The vehicle computer 118 may be communicatively coupled to the electric propulsion 114, a transceiver 122, charge ports 124, a camera 126, and other components via the communications network 120.

The electric propulsion 114 of the vehicle generates energy and translates the energy into motion of the vehicle. The electric propulsion 114 may be an all-electric powertrain including vehicle batteries 128, an electric motor, and a transmission that transfers rotational motion to the wheels; a hybrid powertrain including elements of a conventional powertrain and of the all-electric powertrain; etc. The vehicle batteries 128 may be of any suitable type for vehicular electrification, for example, lithium-ion batteries, nickel-metal hydride batteries, lead-acid batteries, ultracapacitors, etc. Each electric vehicle 102 can have a charge, i.e., a quantity of energy stored in the vehicle batteries 128 of that electric vehicle 102. The electric propulsion 114 can include an electronic control unit (ECU) or the like that is in communication with and receives input from the vehicle computer 118 and/or a human operator. The human operator may control the electric propulsion 114 via, e.g., an accelerator pedal and/or a gear-shift lever.

The transceiver 122 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 122 may be adapted to communicate with a remote server, that is, a server distinct and spaced from the vehicle. The remote server may be located outside the electric vehicle 102. For example, the remote server may be associated with another vehicle (e.g., V2V communications), an infrastructure component (e.g., V2I communications), an emergency responder, a mobile device associated with the owner of the electric vehicle 102, the computer 100 via the network 112, etc. The transceiver 122 may be one device or may include a separate transmitter and receiver.

The charge ports 124 are features to which the operator can electrically connect nonvehicle loads, i.e., electrical loads that are not part of the electric vehicle 102, e.g., the electric machines 104. The charge ports 124 can be any type of feature to which a nonvehicle load can be securely and temporarily attached. For example, the charge ports 124 can be studs, to which the nonvehicle loads can be electrically connected by clipping or screwing. For another example, the charge ports 124 can be outlets into which electrical connectors can be plugged.

The cameras 126 can detect electromagnetic radiation in some range of wavelengths. For example, the cameras 126 may detect visible light, infrared radiation, ultraviolet light, or some range of wavelengths including visible, infrared, and/or ultraviolet light. For example, the camera 126 can be a charge-coupled device (CCD), complementary metal oxide semiconductor (CMOS), or any other suitable type.

Figure 3:
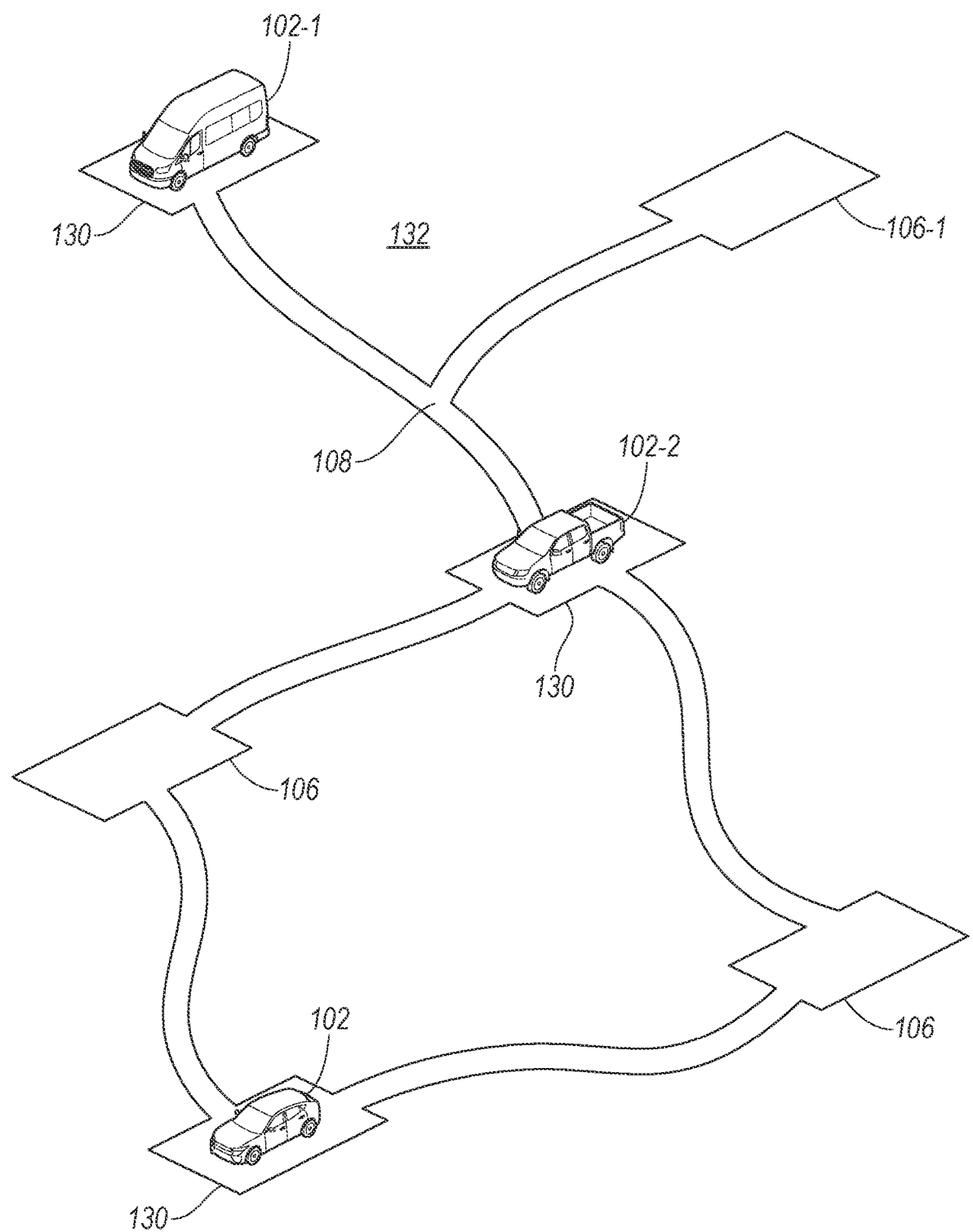
FIG. 3 is a diagram of example locations to which the group of electric vehicles travel.

With reference to FIG. 3, the electric vehicles 102 can be located at a plurality of storage locations 130 before traveling to the job locations 106. The storage locations 130 can be designated locations for the respective electric vehicles 102 to sit when not in use. Some or all of the storage locations 130 can be equipped with chargers for charging the electric vehicles 102, e.g., from the energy grid. The storage locations 130 can be separated from each other, i.e., distributed over a large geographic area 132 such as a city or metro area. The storage locations 130 can be permanent, i.e., stay the same from day to day. The storage locations 130 can be stored in the memory of the computer 100.

The job locations 106 are where the tasks are located. Each job location 106 can have one or more tasks to be performed there. The job locations 106 can change from day to day as the tasks are performed and new tasks are issued. The job locations 106 and the storage locations 130 may be nonoverlapping with each other; i.e., a location can be a job location 106 or a storage location 130 but generally not both. The job locations 106 can be separated from each other, i.e., distributed over the large geographic area 132.

The large geographic area 132 can include the storage locations 130 and the job locations 106, and the storage locations 130 and the job locations 106 can be interspersed in the geographic area 132. In other words, the job locations 106 can be located among the storage locations 130, and vice versa.

The electric vehicles 102 transport the electric machines 104 from the respective storage locations 130 to the respective job locations 106 so that the electric machines 104 can perform the tasks. The computer 100 can instruct the electric vehicles 102 to travel from the respective storage locations 130 to the respective job locations 106, e.g., by transmitting a message via the network 112 and the transceivers 122. The message can be read by an operator of the respective electric vehicle 102 who can then operate the electric vehicle 102 to travel from the storage location 130 to the job location 106, or the electric vehicle 102 can operate autonomously to travel from the storage location 130 to the job location 106 in response to receiving the message. The electric vehicles 102 actuate the electric propulsion 114 to travel from the respective storage locations 130 to the respective job locations 106, thereby consuming energy from the vehicle batteries 128.

The computer 100 can estimate expected energy consumptions of the electric vehicles 102 traveling from the storage locations 130 to the job locations 106. For the purposes of this disclosure, an "expected energy consumption" is defined as a quantity of energy to perform an action as estimated before performing the action. Actions can be, e.g., traveling to the job locations 106, performing the tasks, etc. The computer 100 can estimate the expected energy consumption for one of the electric vehicles 102 to travel from the storage location 130 to the job location 106 based on a type of the electric vehicle 102, a distance to travel from the storage location 130 to the job location 106, types and speed limits of roads along a route from the storage location 130 to the job location 106, traffic along the route, etc., as is known.

The computer 100 can receive the plurality of the tasks to be performed at the locations, e.g., over a time period such as the following day. The tasks can be of a plurality of types, e.g., pouring concrete, building a brick wall, building an interior wall, installing plumbing fixtures, etc. The types of tasks can be preset types stored in the memory of the computer 100. Each task can have one of the job locations 106 at which the task is to be performed. A job location 106 can have one or more tasks to be performed there.

Each type of task can have one or more types of electric machines 104 designated for performing the task. The designated types of electric machines 104 for the respective types of tasks can be stored in the memory of the computer 100. For example, a nail gun and a circular saw can be designated for building an interior wall, a concrete mixer can be designated for pouring concrete, etc.

The tasks can have respective expected energy consumptions for performing the tasks. The expected energy consumptions of different types of tasks are different. The expected energy consumption of a task can be based on the type of the task. For example, installing a sink can have a preset expected energy consumption stored in the memory of the computer 100. The expected energy consumption of a task can also be based on one or more values characterizing the scope of the task. For example, the expected energy consumption of installing an interior wall can be based on a length of the wall, the expected energy consumption of pouring concrete can be based on a surface area of the poured concrete, etc. The computer 100 can store formulas for determining the expected energy consumptions of the preset types of tasks based on the value(s) characterizing the scope of the task, e.g., a formula that receives the length of an interior wall and outputs the expected energy consumption of installing the wall, a formula that receives the surface area to be filled with concrete and outputs the expected energy consumption of pouring the concrete, etc.

The computer 100 can receive data indicating the charges of the electric vehicles 102 and the electric machines 104. The computer 100 can use the data when allocating the electric vehicles 102 to the locations, as will be described below. For each electric vehicle 102, a sum of the charges of that electric vehicle 102 and the electric machines 104 associated with that electric vehicle 102 is available for traveling from the storage location 130 to the job location 106 (once allocated) and performing the tasks for that job location 106.

The computer 100 allocates the electric vehicles 102 to the locations based on the charges of the electric vehicles 102 and electric machines 104 and the expected energy consumptions of the electric vehicles 102 traveling to the job locations 106 and of the electric machines 104 performing the tasks at the locations. The computer 100 can allocate the electric vehicles 102 to the job locations 106 so as to, e.g., minimize total expected energy consumption, minimize the total distance traveled by the electric vehicles 102, maximize the number of electric vehicles 102 for which the sum of the charges of that electric vehicle 102 and its associated electric machines 104 is greater than the expected energy consumption of traveling to the allocated job location 106 and performing the allocated tasks, optimize a cost function of more than one of the foregoing variables, etc. The computer 100 can determine the allocations using, e.g., linear-programming techniques as are known. The allocations can be constrained by which electric vehicles 102 have associated electric machines 104 of the types needed for the types of tasks at the respective job locations 106.

Once the computer 100 has made the allocations, the computer 100 can determine whether each electric vehicle 102 allocated to a job location 106 has sufficient total charge onboard for that job location 106. Specifically, the computer 100 can determine whether the sum of the charge of the electric vehicle 102 and the charges of the electric machines 104 associated with that electric vehicle 102 is less than or at least as great as the sum of the expected energy consumptions of that electric vehicle 102 traveling from its storage location 130 to the allocated job location 106 and of the electric machines 104 performing the tasks at the allocated job location 106, i.e., whether $Q_v + \Sigma Q_t < E_{travel} + \Sigma E_{task}$ or $Q_v + \Sigma Q_t \leq E_{travel} + \Sigma E_{task}$, in which $Q_v$ is the charge of the electric vehicle 102, $Q_t$ is the charge of one of the electric machines 104 associated with the electric vehicle 102, $E_{travel}$ is the expected energy consumption of traveling from the storage location 130 to the job location 106, and $E_{task}$ is the expected energy consumption of one of the tasks.

If, for a first electric vehicle 102-1 allocated to a first job location 106-1, the sum of the charges is less than the sum of the expected energy consumptions, i.e., $Q_v + \Sigma Q_t < E_{travel} + \Sigma E_{task}$, the computer 100 can instruct the user interface 110 to output a plurality of mitigation strategies. The mitigation strategies can include instructing a second electric vehicle 102-2 to charge the first electric vehicle 102-1, instructing the first electric vehicle 102-1 to charge at a second location 108, instructing the first electric vehicle 102-1 to charge at the first job location 106-1, and swapping electric machines 104 and allocated job locations 106 with a second electric vehicle 102-2, as will each be described below. The operator can select one of the mitigation strategies through the user interface 110, and the computer 100 can instruct the electric vehicles 102 accordingly upon receiving the selection.

A first mitigation strategy is to instruct the second electric vehicle 102-2 to travel to a second location 108 at which the first electric vehicle 102-1 will be located and then charge the first electric vehicle 102-1. The computer 100 can instruct the first electric vehicle 102-1 to recharge from the second electric vehicle 102-2 at the second location 108.

The computer 100 can select the second electric vehicle 102-2 for the first mitigation strategy. For example, the second electric vehicle 102-2 can be chosen from the electric vehicles 102 based on not being allocated to a job location 106. For another example, the second electric vehicle 102-2 can be chosen from the electric vehicles 102 based on having excess charge to cover a shortfall of charge by the first electric vehicle 102-1, i.e., based on the second electric vehicle 102-2 and the electric machines 104 associated with the second electric vehicle 102-2 having charges summing to greater than a difference between the expected energy consumptions of the first electric vehicle 102 traveling to the first location and performing the tasks minus the charges of the first electric vehicle 102 and the electric machines 104 associated with the first electric vehicle 102, i.e., $Q_{v2} + \Sigma Q_{t2} > E_{travel} + \Sigma E_{task} - (Q_{v1} + \Sigma Q_{t1})$, in which. If none of the electric vehicles 102 qualify, then the computer 100 does not display the first mitigation strategy as an available mitigation strategy to the operator.

The computer 100 can select the second location 108. For example, the second location 108 can be the first job location 106-1, e.g., if the first job location 106-1 is between the storage location 130 of the second electric vehicle 102-2 and the job location 106 allocated to the second electric vehicle 102-2. For another example, the second location 108 can be not included in the plurality of job locations 106, as shown in FIG. 3, in which case the computer 100 can instruct the first electric vehicle 102 to travel to the second location 108 before traveling to the first job location 106. The computer 100 can choose a second location 108 that minimizes a total distance traveled by the first and second electric vehicles 102-1, 102-2.

A second mitigation strategy is to instruct the first electric vehicle 102-1 to charge at a second location 108 before traveling to the first job location 106. For example, the second location 108 can be the storage location 130 of the first electric vehicle 102-1, if that storage location 130 is equipped with a charger. For another example, the second location 108 can be a public charging facility, if available. If the storage location 130 of the first electric vehicle 102-1 does not have a charger and no public charging facilities are available, then the computer 100 does not display the second mitigation strategy as an available strategy.

A third mitigation strategy is to instruct the first electric vehicle 102 to recharge at the first job location 106-1. For example, the computer 100 can transmit a request to an operator of the first job location 106-1 that the first electric vehicle 102 be permitted to recharge at the first job location 106-1. If the computer 100 receives a confirmation from the operator in response, the computer 100 instructs the first electric vehicle 102-1 to recharge at the first job location 106. If the first job location 106-1 is not equipped to recharge the first electric vehicle 102-1, then the computer 100 does not display the third mitigation strategy as an available strategy. If the operator of the first job location 106-1 declines permission, then the computer 100 outputs the remaining available mitigation strategies for the operator of the group to select a different mitigation strategy.

A fourth mitigation strategy is to instruct the first electric vehicle 102-1 and a second electric vehicle 102-2 to swap associated electric machines 104, i.e., place the electric machines 104 associated with the first electric vehicle 102-1 in the second electric vehicle 102-2 and place the electric machines 104 associated with the second electric vehicle 102-2 in the first electric vehicle 102-1. The computer 100 can reallocate the first electric vehicle 102-1 to the job location 106 to which the second electric vehicle 102-2 had been allocated, and reallocate the second electric vehicle 102-2 to first job location 106-1. The second electric vehicle 102 can be selected from the electric vehicles 102 so that the first and second electric vehicles 102-1, 102-2 have sufficient charge for the newly allocated job locations 106. If none of the electric vehicles 102 have sufficient charge for the first job location 106-1 or if the first electric vehicle 102-1 has insufficient charge to travel to any of the other job locations 106, then the computer 100 does not display the fourth mitigation strategy as an available strategy.

After the computer 100 has made the allocations and any mitigation strategies have been selected, the computer 100 instructs the electric vehicles 102 to travel to the respective allocated job locations 106. The computer 100 instructs the electric vehicles 102 to charge the respective electric machines 104 via the charge ports 124, e.g., by electrically connecting the charge ports 124 to the vehicle batteries 128. The computer 100 can instruct the electric vehicles 102 to charge the electric machines 104 after arriving at the job locations 106 so that the electric machines 104 have lower charges while traveling. Keeping the electric machines 104 at lower charges when not in use can extend the lifespans of the machine batteries 116 and is helpful in case the electric vehicle 102 is involved in an impact. At the job locations 106, workers can use the electric machines 104 to perform the tasks. After the tasks are performed, the electric vehicles 102 can travel from the job locations 106 back to the storage locations 130.

The computer 100 can instruct the electric vehicles 102 to put the electric machines 104 at respective predetermined charge levels after the electric machines 104 have been used to perform the tasks. The predetermined charge levels are stored in the computer 100. The computer 100 can store a predetermined charge level for each type of electric machine 104. The predetermined charge levels can be chosen to maximize the lifespans of the machine batteries 116 or to minimize a risk from damage to the machine batteries 116 during travel. Accordingly, the predetermined charge levels can be below fully charged, e.g., below half charged.

For example, the computer 100 can instruct the electric vehicles 102 to recharge the electric machines 104 to the respective predetermined charge level after the tasks have been performed, e.g., after leaving the job locations 106 and arriving at the storage locations 130, if the charge of the machine battery 116 is below the predetermined charge level. For another example, in response to one of the electric machines 104 being charged above the respective predetermined charge level after performing the respective tasks at the respective job location 106, the computer 100 can instruct the respective electric vehicle 102 to recharge from that electric machine 104, i.e., draw charge from the machine battery 116 to the vehicle batteries 128, until that electric machine 104 reaches the respective predetermined charge level and then cease recharging that electric machine 104. Recharging the electric vehicle 102 from the electric machine 104 can occur after performing the tasks and before leaving the job location 106.

The computer 100 can instruct the electric vehicles 102 to, after the tasks are performed at the respective job locations 106, receive data indicating actual energy consumptions of the electric vehicles 102 and the electric machines 104 from the electric vehicles 102 and output the data. For the purposes of this disclosure, an "actual energy consumption" is defined as a measured quantity of energy to perform an action. Actions can be, e.g., traveling to the job locations 106, performing the tasks, etc. For example, the computer 100 can instruct the user interface 110 to display the data, e.g., for each electric vehicle 102 and each electric machine 104.

The actual energy consumptions can be compared to the respective expected energy consumptions. For example, in response to a sum of the actual energy consumption of a first electric vehicle 102-1 and the electric machines 104 associated with the first electric vehicle 102-1 exceeding a sum of the expected energy consumption of the first electric vehicle 102-1 and the electric machines 104 associated with the first electric vehicle 102-1 by at least a threshold, i.e., $Q_{travel}+\Sigma Q_{task}-(E_{travel}+\Sigma E_{task}) \geq T$, in which $Q_{travel}$ is the actual energy consumption of the first electric vehicle 102-1 traveling from the storage location 130 to the job location 106, $Q_{task}$ is the actual energy consumption for performing one of the tasks, and T is the threshold, the computer 100 can perform a remedial action. The computer 100 can store multiple thresholds corresponding with different remedial actions, e.g., a first threshold $T_1$ corresponding with a first remedial action, a second threshold $T_2$ corresponding with a second remedial action, and a third threshold $T_3$ corresponding with a third remedial action. The thresholds can be chosen to indicate abnormal energy consumption at differing degrees of certainty. The third threshold $T_3$ can be greater than the second threshold $T_2$, and the second threshold $T_2$ can be greater than the first threshold $T_1$, i.e., $T_3 > T_2 > T_1$, meaning that the third threshold $T_3$ indicates the highest degree of certainty.

When the difference between the actual and expected energy consumptions exceeds one of the thresholds, the computer 100 performs the corresponding remedial action. For example, the first remedial action can be outputting a message, e.g., via the user interface 110. The message can indicate an identity of the electric vehicle 102 with excessive energy consumption and the quantity by which the actual energy consumption exceeded the expected energy consumption. For another example, the second remedial action can be instructing the electric vehicle 102 with excessive energy consumption to transmit data from the camera 126 of that electric vehicle 102, e.g., recorded during the energy consumption and showing a portion of that electric vehicle 102 including the charge ports 124. The operator can then evaluate how the worker was using the electric machines 104. For another example, the third remedial action can be instructing the electric vehicle 102 with excessive energy consumption to disable the charge ports 124 of that electric vehicle 102, i.e., disconnect the charge ports 124 from the vehicle batteries 128, thereby preventing further energy consumption by the electric machines 104 or anything else connected to the charge ports 124.

Figure 4:
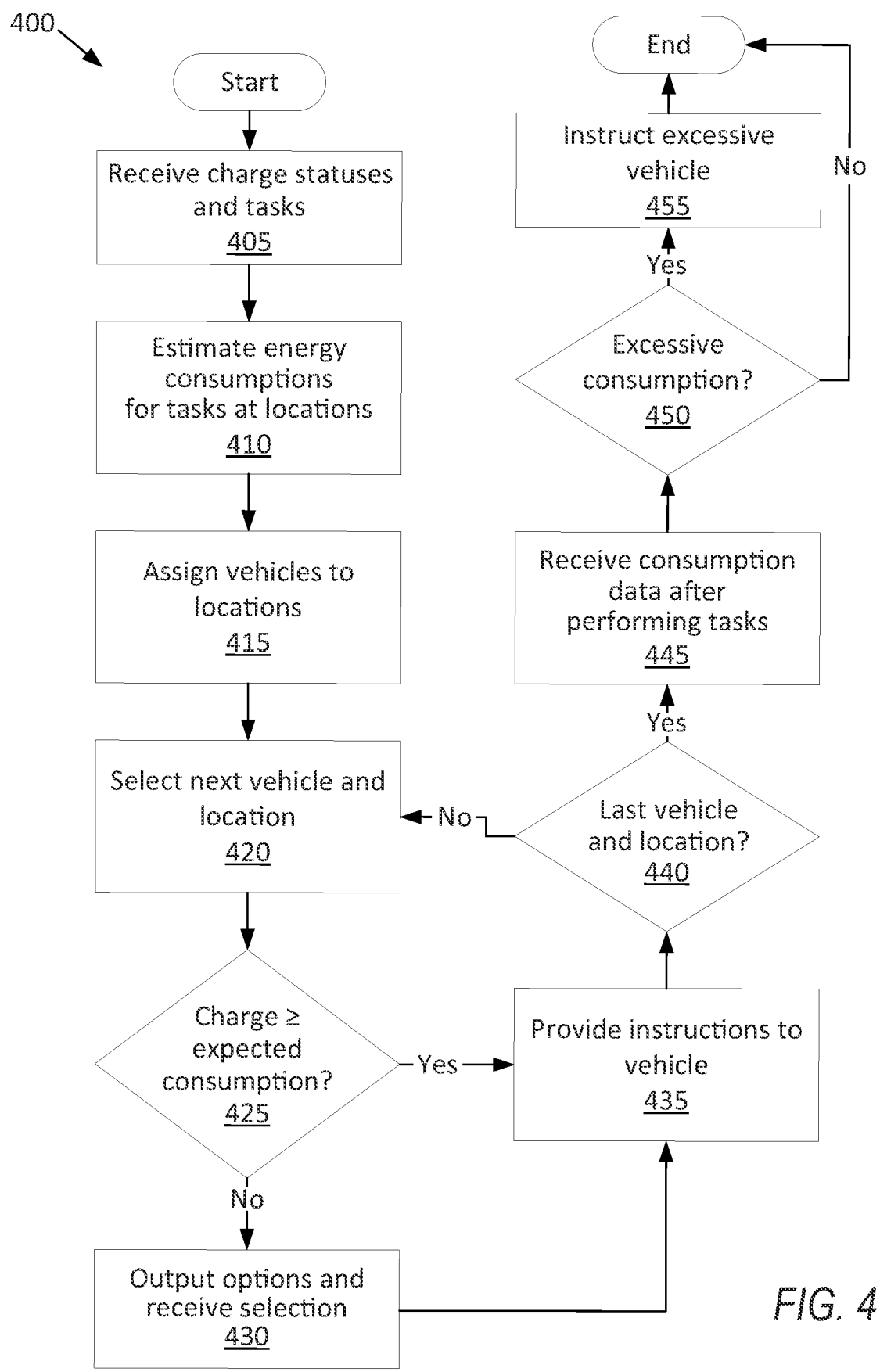
FIG. 4 is a process flow diagram of an example process for managing energy consumption by the group of vehicles.

FIG. 4 is a process flow diagram illustrating an exemplary process 400 for managing energy consumption by the group of electric vehicles 102. The memory of the computer 100 stores executable instructions for performing the steps of the process 400 and/or programming can be implemented in structures such as mentioned above. As a general overview of the process 400, the computer 100 receives data indicating the charges of the electric vehicles 102 and electric machines 104 and the tasks to be performed at the job locations 106, determines the expected energy consumptions for the tasks, and allocates the electric vehicles 102 to the job locations 106. For each electric vehicle 102, the computer 100 determines whether the sum of the charges of that electric vehicle 102 and the electric machines 104 associated with that electric vehicle 102 is less than the sum of the expected energy consumptions of that electric vehicle 102 traveling to the respective job location 106 and of the electric machines 104 associated with that electric vehicle 102, and if so, receives a selection for a mitigation strategy. The computer 100 instructs each electric vehicle 102 according to the allocations and the selected mitigation strategies. After the tasks have been performed, the computer 100 receives the actual energy consumptions. If the sum of the actual energy consumptions of one of the electric vehicles 102 and the electric machines 104 associated with that electric vehicle 102 exceed the sum of the expected energy consumption of that electric vehicle 102 and the electric machines 104 associated with that electric vehicle 102 by at least one of the thresholds, the computer 100 instructs that electric vehicle 102 to perform the remedial action corresponding to the threshold exceeded.

The process 400 begins in a block 405, in which the computer 100 receives data indicating the charges of the electric vehicles 102 and the electric machines 104, as well as the tasks with their corresponding job locations 106.

Next, in a block 410, the computer 100 determines the expected energy consumptions for the tasks, as described above.

Next, in a block 415, the computer 100 allocates the electric vehicles 102 to the job locations 106, as described above.

Next, in blocks 420-440, the computer 100 iterates through the electric vehicles 102. In the block 420, the computer 100 selects a next electric vehicle 102 in a preset order from the electric vehicles 102 as a current electric vehicle 102 for the blocks 425-440.

Next, in the decision block 425, the computer 100 determines whether the sum of the charges of the current electric vehicle 102 and the electric machines 104 associated with the current electric vehicle 102 is less than the sum of the expected energy consumptions of the current electric vehicle 102 traveling to the respective job location 106 and of the electric machines 104 associated with the current electric vehicle 102. If so, the process 400 proceeds to a block 430. If not, the process 400 proceeds to a block 435.

In the block 430, the computer 100 instructs the user interface 110 to output the available mitigation strategies and receives a selection from the operator via the user interface 110, as described above. After the block 430, the process 400 proceeds to the block 435.

In the block 435, the computer 100 instructs the current electric vehicle 102 to travel to the allocated job location 106, charge the respective electric machines 104 via the charge ports 124 of the current electric vehicle 102, and to follow the selected mitigation strategy if applicable, as described above.

Next, in the decision block 440, the computer 100 determines whether the current electric vehicle 102 is the last electric vehicle 102 in the preset order. If so, the process 400 proceeds to a block 445. If not, the process 400 returns to the block 420 to iterate to the next electric vehicle 102 in the preset order.

In the block 445, the computer 100 receives the actual energy consumptions from the electric vehicles 102 after the tasks have been performed at the job locations 106, as described above.

Next, in a decision block 450, the computer 100 determines whether, for at least one of the electric vehicles 102, the sum of the actual energy consumption of that electric vehicle 102 and the electric machines 104 associated with that electric vehicle 102 exceed the sum of the expected energy consumption of that electric vehicle 102 and the electric machines 104 associated with that electric vehicle 102 by at least one of the thresholds. If so, the process 400 proceeds to a block 455. If not, the process 400 ends.

In the block 455, the computer 100 performs the remedial actions for the electric vehicles 102 with excessive energy consumption according to which of the thresholds were exceeded, as described above. After the block 455, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," etc. are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
receive data indicating charges of a plurality of electric vehicles and a plurality of electric machines, the electric vehicles including a first electric vehicle and a second electric vehicle, the electric machines being associated with the respective electric vehicles;

receive a plurality of tasks to be performed at a plurality of locations, the locations including a first location;

allocate the electric vehicles to the locations based on the charges of the electric vehicles and electric machines and expected energy consumptions of the electric vehicles traveling to the locations and of the electric machines performing the tasks at the locations, the first electric vehicle being allocated to the first location; and in response to a sum of the charges of the first electric vehicle and the electric machines associated with the first electric vehicle being less than a sum of the expected energy consumptions of the first electric vehicle traveling to the first location and of the electric machines associated with the first electric vehicle performing the tasks at the first location, instruct the second electric vehicle to travel to a second location at which the first electric vehicle will be located.

2. The computer of claim 1, wherein the second location is the first location.

3. The computer of claim 1, wherein the second location is not included in the plurality of locations, and the instructions further include instructions to instruct the first electric vehicle to travel to the second location before traveling to the first location.

4. The computer of claim 1, wherein the instructions further include instructions to instruct the electric vehicles to, after leaving the locations, recharge the electric machines to respective predetermined charge levels.

5. The computer of claim 4, wherein the predetermined charge levels are below fully charged.

6. The computer of claim 5, wherein the instructions further include instructions to, in response to one of the electric machines being charged above the respective predetermined charge level after performing the respective tasks at the respective location, instruct the respective electric vehicle to recharge from that electric machine until that electric machine reaches the respective predetermined charge level.

7. The computer of claim 5, wherein the predetermined charge levels are below half charged.

8. The computer of claim 1, wherein the electric vehicles include a third electric vehicle, the plurality of locations include a third location to which the third electric vehicle is allocated, and the instructions further include instructions to, in response to a sum of the charges of the third electric vehicle and the electric machines associated with the third electric vehicle being less than a sum of the expected energy consumptions of the third electric vehicle traveling to the third location and of the electric machines associated with the third electric vehicle performing the tasks at the third location, instruct the third electric vehicle to charge at a fourth location before traveling to the third location.

9. The computer of claim 8, wherein the plurality of locations are job locations, the electric vehicles are located at a plurality of storage locations including the fourth location before traveling to the job locations, and the storage locations are separated from each other.

10. The computer of claim 1, wherein the electric vehicles include a third electric vehicle, the plurality of locations include a third location to which the third electric vehicle is allocated, and the instructions further include instructions to, in response to a sum of the charges of the third electric vehicle and the electric machines associated with the third electric vehicle being less than a sum of the expected energy consumptions of the third electric vehicle traveling to the third location and of the electric machines associated with the third electric vehicle performing the tasks at the third location, instruct the third electric vehicle to recharge at the third location.

11. The computer of claim 10, wherein the plurality of locations are job locations, the electric vehicles are located at a plurality of storage locations before traveling to the job locations, and the storage locations are nonoverlapping with the job locations.

12. The computer of claim 1, wherein the instructions further include instructions to instruct the electric vehicles to, after the tasks are performed at the locations, output data indicating actual energy consumptions of the electric vehicles and the electric machines.

13. The computer of claim 12, wherein the electric vehicles include a third electric vehicle, and the instructions further include instructions to, in response to a sum of the actual energy consumptions of the third electric vehicle and the electric machines associated with the third electric vehicle exceeding a sum of the expected energy consumptions of the third electric vehicle and the electric machines associated with the third electric vehicle by at least a threshold, output a message.

14. The computer of claim 12, wherein the electric vehicles include a third electric vehicle, and the instructions further include instructions to, in response to a sum of the actual energy consumptions of the third electric vehicle and the electric machines associated with the third electric vehicle exceeding a sum of the expected energy consumptions of the third electric vehicle and the electric machines associated with the third electric vehicle by at least a threshold, instruct the third electric vehicle to transmit data from a camera of the third electric vehicle.

15. The computer of claim 12, wherein the electric vehicles include a third electric vehicle, and the instructions further include instructions to, in response to a sum of the actual energy consumption of the third electric vehicle and the electric machines associated with the third electric vehicle exceeding a sum of the expected energy consumption of the third electric vehicle and the electric machines associated with the third electric vehicle by at least a threshold, instruct the third electric vehicle to disable a charge port of the third electric vehicle.

16. The computer of claim 1, wherein the plurality of locations are separated from each other.

17. The computer of claim 1, wherein the tasks include a plurality of types of the tasks, and the expected energy consumptions of the electric machines performing different types of tasks are different.

18. The computer of claim 17, wherein the electric machines include a plurality of types of the electric machines associated with the respective types of the tasks.

19. The computer of claim 1, wherein the instructions further include instructions to instruct the electric vehicles to charge the respective electric machines via charge ports of the electric vehicles.

20. A method comprising:

receiving data indicating charges of a plurality of electric vehicles and a plurality of electric machines, the electric vehicles including a first electric vehicle and a second electric vehicle, the electric machines being associated with the respective electric vehicles;

receiving a plurality of tasks to be performed at a plurality of locations, the locations including a first location;

allocating the electric vehicles to the locations based on the charges of the electric vehicles and electric machines and expected energy consumptions of the electric vehicles traveling to the locations and of the electric machines performing the tasks at the locations, the first electric vehicle being allocated to the first location; and in response to a sum of the charges of the first electric vehicle and the electric machines associated with the first electric vehicle being less than a sum of the expected energy consumptions of the first electric vehicle traveling to the first location and of the electric machines associated with the first electric vehicle performing the tasks at the first location, instructing the second electric vehicle to travel to a second location at which the first electric vehicle will be located.

\* \* \* \* \*